Dec. 21, 1954   R. C. DEHMEL   2,697,285
SIMULATED FLIGHT AND RADIO NAVIGATION APPARATUS
Filed Nov. 4, 1950
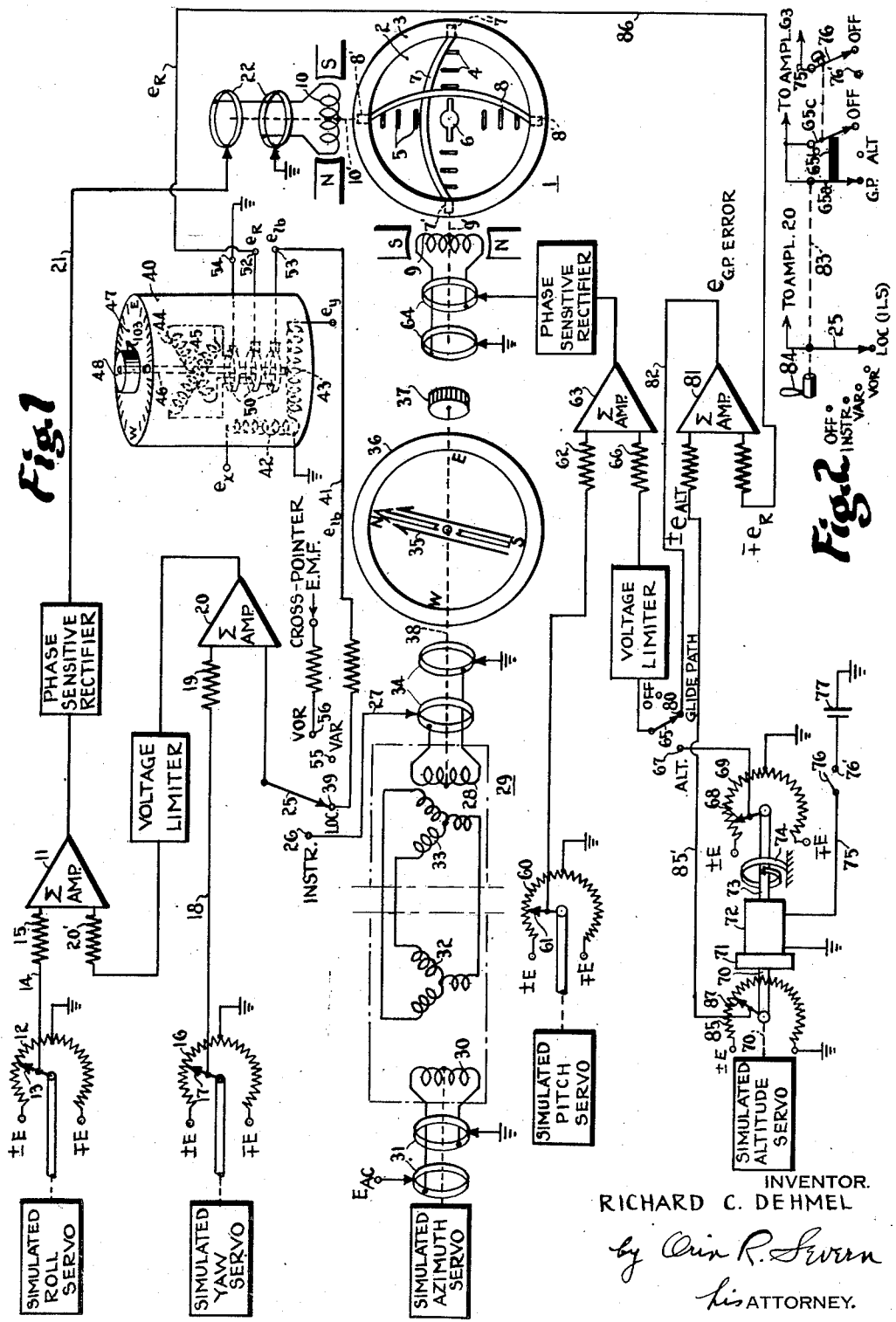
INVENTOR.
RICHARD C. DEHMEL United States Patent Office 2,697,285
Patented Dec. 21, 1954

2,697,285

SIMULATED FLIGHT AND RADIO NAVIGATION APPARATUS

Richard C. Dehmel, Short Hills, N. J.

Application November 4, 1950, Serial No. 194,070

13 Claims. (Cl. 35—10.2)

This invention relates to means for simulating flight and radio navigation apparatus for use in grounded flight trainers, and particularly to simulated flight-guiding apparatus of the zero-centering type known specifically to the trade as "zero-reader."

The principal object of the invention is to provide realistic instrument training apparatus of the above character that is capable of accurately simulating the cross bar indications of a "zero-reader" for various conditions of operation, and that is also simple in design and adapted for operation in connection with modern simulated flight computing and radio aid systems.

The so-called "zero-reader" which has been recently developed for improving the technique of instrument landing as well as steady flight navigation at predetermined altitude, course direction or compass heading is a gyroscopic responsive flight instrument that gives to the pilot on a simple two-element indicator information ordinarily obtained by reading the gyro-horizon, directional gyro, magnetic compass, altimeter and cross-pointer indicator. The indicator face of the "zero-reader" has two cross bars arranged respectively horizontally and vertically, each of which can move laterally across the instrument face with reference to a center zero position in a direction to inform the pilot how he should move his controls to "center" the respective bar. For example, when the pilot sets the instrument control for an instrument landing, i. e., under the radio guidance of the field's instrument landing system (ILS), the horizontal bar indicates the change in rate at which the aircraft should be flown to reach the glide path and the vertical bar indicates the change in rate at which the aircraft should be flown to reach the direction or localizer beam. When the instrument control is set for normal flight on a radio range, either Visual Aural Range (VAR) or Visual Omnidirectional Range (VOR), the horizontal bar indicates the change in rate at which the aircraft should be flown to reach a selected altitude and the vertical bar indicates the change in rate at which the aircraft should be flown to reach a selected course or compass heading. The control is such that the course of the flight is anticipated for instant conditions of velocity, acceleration and off-course error.

The pilot in order to maintain proper altitude and direction simply moves the respective flight controls so as to keep the bars centered at zero. For example, if the aircraft is too far to the right of its course and flying so that the off-course error is not being corrected properly, the vertical bar is positioned to the left of zero, thereby informing the pilot that he should fly more rapidly toward the left. The instrument inputs in this case which include the turning correction and the off-course error, are related to maintain the vertical bar on zero when the flight of the aircraft is such that it will curve smoothly onto the selected course without overshooting or hunting. Thus the pilot has but to keep the vertical bar on zero in order to anticipate his flight and to swing directly onto his course thereby eliminating the usual time-consuming procedure turns.

In the case of flight dropping below a selected altitude together with improper pitch altitude for correction, the horizontal bar is positioned above center zero thereby informing the pilot to fly upward. When the elevator is moved to obtain the proper climbing attitude, the horizontal bar reads zero and the proper altitude is soon attained without hunting simply by keeping the bar centered on zero. Similarly, the horizontal and vertical bars guide the pilot in approaching and staying on the glide and the localizer beams respectively during an ILS approach.

In accordance with the present invention a two-element indicator simulating the "zero-reader" is controlled according to simulated flight conditions through suitable control quantity deriving and resolving apparatus for representing the approach of a simulated flight relative to radio guiding facilities or preselected flight conditions such as altitude and compass heading.

The invention will be more fully set forth in the following description referring to the accompanying drawing, and the features of novelty will be pointed out with particularity in the claims annexed to and forming a part of this specification.

Referring to the drawing Fig. 1 is a partly diagrammatic and schematic view of simulated "zero-reader" indicating and control apparatus embodying the present invention, and Fig. 2 illustrates a form of control switching that may be used in practicing the invention.

The control quantity inputs for the simulated "zero-reader" indicating apparatus of the present invention represent roll, yaw, compass heading and pitch of the simulated flight, and also include optional inputs representing altitude and radio tracking error. These control quantities except in the case of radio tracking may be obtained from suitable flight computing apparatus for grounded aircraft trainers such as that disclosed by my copending application, S/N 429,314 filed May 12, 1954 which is a continuation of my application (now abandoned) S/N 777,414 filed October 2, 1947, for "Flight Computing System and Apparatus." Radio tracking quantities for simulating ILS approach may be obtained from suitable radio navigation training apparatus such as that disclosed by my Patent No. 2,560,528, granted July 10, 1951, for "Training Means For Blind Navigating Systems." Accordingly, the repetition in this application of detail disclosure of such computing and training apparatus used for obtaining control quantities is unnecessary.

The simulated "zero-reader" indicator is represented generally at 1 and comprises a fixed hemi-spherical dial 2 supported within a frame 3 and provided with suitable guide markings 4 and 5 arranged centrally across the dial in horizontal and vertical rows respectively. The intersection of the rows is defined by a distinguishing mark 6 designating the center zero of the instrument. Two cross-bar elements 7 and 8 are pivotally mounted in the frame at 7' and 8' in alignment with rows 4 and 5 respectively and are independently movable laterally over the face of the dial 2 within limits indicated. In the centered positions thereof the bars are both in front of the center zero mark 6 with the bar 8 shown as overlapping the bar 7.

The operating means for the bars 7 and 8 may comprise voltmeter elements or the like such as rotatable coils 9 and 10 respectively which are suitably mechanically connected as indicated at 9' and 10' to the respective bars. The vertical bar as previously disclosed is for course tracking, either localizer or radio range, and for maintaining a preselected heading; and the horizontal bar is for following a glide beam, or alternatively for maintaining a preselected altitude. In both cases the pilot simply operates the aircraft controls so as to keep the bars centered with the result that the flight moves along a gradually flattening or exponential curve onto the selected course or flight level or compass heading without overshooting or hunting.

This can be more simply explained, taking the vertical bar for example, by stating that control quantities representing roll and yaw on the one hand are compared with a control quantity representing tracking deviation or error on the other hand. The amount of yaw is represented as the first derivative of the course deviation or error and the amount of roll is represented as the second derivative since roll tends to increase yaw. Accordingly, when the combined first and second derivative quantities, i. e., velocity and acceleration are balanced against the deviation error, the latter can be reduced to zero without hunting simply by maintaining the opposing quantities in balance, or, in other words, holding the resultant control quantity at zero. In the case of altitude control or glide beam tracking, it is sufficient to use simply the first derivative of the deviation, i. e., pitch, for balancing the altitude error.

The apparatus herein described for controlling the respective positions of the cross bar coils 9 and 10, comprises voltage deriving and resolving means in turn controlled in part by simulated flight computing apparatus such as that shown in my aforesaid application, S. N. 429,314. Considering first the vertical bar, its operating coil 10 is arranged to be energized by a resultant voltage from a summing amplifier 11 that is in turn energized by derived voltages representing simulated roll, yaw and error with respect to a selected compass heading or radio tracking facility such as a localizer or radio range beam.

For producing the roll quantity a simulated roll potentiometer 12 having a grounded center tap and a slider contact 13 is energized at its opposite terminals as indicated by a reference A. C. voltage oppositely phased. The slider contact may be connected for example to servo apparatus such as that designated "roll" in my aforesaid application, S. N. 429,314, so that when the roll of the simulated flight is zero the slider contact is at the center ground position at which the derived voltage is zero. For representing right or left wing down, the slider is moved from the ground position in one direction for right roll and in the other for left roll so that the derived voltages representing right and left roll are opposite in phase. The slider contact 13 is connected by conductor 14 through a suitable proportioning resistance 15 to the input side of amplifier 11.

For producing the yaw quantity a simulated yaw potentiometer 16 energized by an oppositely phased voltage and having a slider contact 17 may in like manner be operated by servo apparatus such as that designated "rate of yaw" in my aforesaid application, S. N. 429,314, for deriving an A. C. control voltage depending in phase and magnitude on the direction and amount of yaw respectively. This voltage is led through conductor 18 and proportioning resistance 19 to the input side of a summing amplifier 20 which may have other optional inputs as previously described depending on whether the student requires radio tracking or compass heading guidance. The output of amplifier 20 is directed through a suitable voltage limiting device indicated for a purpose hereinafter described, the proportioning resistance 20' at the input side of summing amplifier 11. The output of amplifier 11 is in turn directed through a phase-sensitive rectifier, conductor 21 and slip rings 22 to the coil 10 for positioning the vertical bar 8.

The aforesaid optional inputs for amplifier 20 may comprise respectively a compass heading deviation voltage depending on the difference between the instant heading and a preselected compass heading, a localizer deviation voltage for simulating ILS approach, and additional radio tracking voltages depending on whether VAR or VOR systems are simulated. These inputs can be selected by the student as in practice by positioning a selector switch 25 that is connected to the input side of the amplifier on one of a plurality of contact positions representing flight instrument (compass), localizer and alternative radio range systems respectively and marked INSTR, LOC, VAR and VOR.

The heading deviation voltage is connected to the amplifier by positioning the switch 25 on the INSTR contact 26. This contact is in turn connected through conductor 27 to a secondary or output winding 28 of a rotary transformer or voltage resolver system 29. The primary input winding 30 is energized from the aforesaid source of reference voltage $E_{ac}$ through slip rings 31 and is oriented with respect to a north reference position according to simulated heading also by servo apparatus such as that designated "azimuth" in my aforesaid application, S. N. 429,314. A fixed Y-connected secondary winding 32 is connected to a similar winding 33 for inducing in the circuit of the output winding 28 a voltage dependent in phase and magnitude on the relative orientation of the coils 28 and 30. The coil 28 which is connected in the circuit through slip rings 34 is oriented by the student in accordance with his setting of the heading selector 35 of the simulated magnetic compass 36 having for this purpose a manual dial 37. The dial, heading selector and coil are all mechanically interconnected by a shaft indicated at 38.

Accordingly, the voltage thereby induced in the circuit of coil 28 may represent the heading deviation of the simulated flight with respect to a preselected compass heading and this voltage may in turn be combined with the yaw voltage at amplifier 20 and the resultant voltage balanced against the roll voltage at amplifier 11 to produce a zero-reader control voltage for operating the coil 10. As above pointed out, the phase relationship of the roll and yaw voltages is opposite to that of the heading deviation voltage so that the vertical bar 8 may be centered at zero when roll and yaw are kept properly adjusted, i. e. when the proper simulated flight control conditions obtain for a smooth turn onto the selected heading and reference path. The voltage limiter for the output of amplifier 20 may be of any suitable type well known in the art and is simply for the purpose of limiting the magnitude of the voltage to a value where full-scale deflection of the bar 8 from zero is obtained by 30° roll in either direction of 22° heading deviation in either direction as in practice. These limits vary for different types of aircraft.

In the case of a simulated ILS approach, the student throws the selector switch 25 to engage contact 39 at LOC, thereby directing to the amplifier 20 an input voltage representing deviation from the localizer beam. This radio tracking voltage designated $e_{1b}$ can be obtained from suitable apparatus such as for example an A. C. resolver 40 that is operable for resolving cartesian coordinator position voltages into voltages representing respectively the instant range of the simulated flight from a reference point and the deviation of the flight from a direction beam, as described in my aforesaid Patent No. 2,560,528. The resolver may have fixed primary quadrature windings 42 and 43 and relatively rotatable secondary quadrature windings 44 and 45 inductively related thereto. The primary windings 42 and 43 are grounded at a common terminal as indicated and are energized respectively by voltages $e_x$ and $e_y$ representing the instant flight position in a cartesian coordinate system. The secondary windings 44 and 45 are rotatable as a unit with shaft 46 and are adapted to be oriented with respect to an azimuth index 47 by means of dial 48 according to the assumed localizer beam direction. The secondary windings are connected through slip rings 50 to a common ground terminal as indicated and to output terminals 52 and 53.

The voltage $e_r$ at terminal 52 represents instant range of the simulated flight from a reference point, i. e., radio station, and the voltage $e_{1b}$ at terminal 53 which is connected to the selector switch contact 39 by conductor 41, represents the flight deviation from the localizer beam. These voltages are directed to the "zero-reader" simulating system, the voltage $e_{1b}$ being used in the same manner as the heading deviation voltage previously described for controlling the vertical bar 8. That is, an unbalanced deviation voltage representing uncorrected flight to the right of the localizer beam causes the bar 8 to move off center to the left thereby informing the student that he should fly left, and conversely, an unbalanced deviation voltage of opposite phase representing uncorrected flight to the left of the beam causes the bar to move right of center to inform the student to fly toward the right. When the deviation voltage is exactly balanced by the yaw and roll voltages above described, the bar 8 is centered and the flight is thus represented as either properly approaching, or on, the desired course. The voltage $e_r$ is used in combination with an altitude voltage for controlling the horizontal bar 7 for glide path tracking in a manner presently described.

The student can also simulate radio tracking on standard range systems in a manner similar to that described in connection with localizer tracking. Control voltages from VAR or VOR simulating systems representing deviations from a direction beam or from a selected omnicourse can be used when desired by throwing the selector switch 25 to either contact 55 or 56. In the case of VAR simulation a deivation voltage can readily be obtained according to the deviation of the flight from a direction beam, as in the case of the localizer beam above referred to, and in the case of VOR simulation, the deviation or "tracking" voltage can be taken directly from computing apparatus such as shown in Fig. 6 of my Patent Re. 23,627 granted March 10, 1953 for "Off-Set Course Computing and Indicating Apparatus."

The control of the horizontal bar 7 and its coil 9 is essentially the same as the vertical bar insofar as the sense of bar deflection and voltage application are concerned. In the present instance pitch attitude is a permanent factor and accordingly an A. C. voltage derived from a potentiometer 60 at slider contact 61 according to simulated pitch is fed through a proportioning resistance 62 to a summing amplifier 63, the output of which is rectified by a phase sensitive rectifier for energizing the coil 9 through slip rings 64. The potentiometer 60 is energized at opposite terminals by a reference A. C. voltage as indicated and has a grounded center tap for representing positive and negative pitch. The slider 61 may be positioned according to simulated pitch by servo apparatus such as that designated "pitch" in my aforesaid application S.N. 429,314.

The alternative inputs for amplifier 63 are voltages representing altitude error and glide beam deviation or tracking error respectively. The altitude error represents deviation from a preselected flight altitude. In actual practice, the "zero-reader" can not be used for altitude control until the aircraft is flown to the desired level as indicated by the altimeter itself. At that point the altitude control is switched on by the pilot and the horizontal bar of the "zero-reader" then indicates uncorrected deviation from that level.

When the student wishes to simulate flight at a predetermined altitude, he "flies" to that level as indicated by his simulated altimeter and then throws the selector switch 65 to the contact 67 at position ALT. The switch is connected through a voltage limiter as indicated and a proportioning resistance 66 to the input side of amplifier 63, thereby connecting the amplifier input circuit to the slider 68 of the preselected altitude potentiometer 69. This potentiometer is energized at opposite terminals by the oppositely phased reference A. C. voltage and has a grounded center tap as indicated for representing above and below the preselected altitude level. The derived voltage at slider 68 therefore varies in phase and magnitude according to a representation of either too great or too little altitude with respect to the preselected level.

For the purpose of adjusting and operating the preselected altitude potentiometer 69, the slider 68 is arranged to be connected to simulated altitude servo apparatus such as that designated "altitude" in my aforesaid application S. N. 429,314 through a shaft 70, step-up gear box 71, magnetic clutch 72 and shaft 73. The shaft 73 is provided with a suitable spring 74 that tends to return the shaft and slider 68 to the neutral position, i. e., wherein the slider is at the center ground position. The magnetic clutch which may be of any suitable construction is provided with an energizing circuit including conductor 75, control switch 76 and source of voltage 77. The switch 76 is open when the altitude control is off, thereby deenergizing the clutch and decoupling the shaft 73 from the step-up gearing. In this condition, the spring 74 centers the potentiometer slider 68 at the ground position. When the altitude servo apparatus through its indicator (not shown) represents the desired altitude level, the student may switch on the "altitude control" by closing the switch 76 thereby coupling through the magnetic clutch the slider 68 to the servo apparatus. From then on, deviations from the selected level are represented by derived voltages variable in phase and magnitude for balancing the pitch input voltage at resistance 62.

The input circuit for the altitude voltage also includes a voltage limiter as indicated that functions simply to limit the magnitude of the derived voltage, as determined by the input voltage $\pm E$ on potentiometer 69, so that in the case of altitude control a 1° deflection of the horizontal bar represents for example from 20 to 40 feet change in altitude depending on the speed characteristics of the aircraft simulated.

By reason of the step-up gearing 71 the altitude error voltage can be made sufficiently large to facilitate fairly precise control at the selected level. Thus, when the student is using altitude control, he corrects for too low altitude (as evidenced by the horizontal bar being above center) by increasing pitch. The resulting derived pitch voltage which is opposite in phase to the sub-altitude error voltage tends to balance out the error voltage. When the pitch voltage exactly equals the error voltage the resultant output of amplifier 63 is zero and the coil 9 is deenergized so that the horizontal bar is centered on zero. For this instant condition the pitch is proper for regaining the lost altitude. However, as the altitude error becomes less the pitch voltage, unless corrected, is dominant and there is a resultant output voltage from amplifier 63 causing deflection of the coil 9 so as to move the bar below center. This tells the student to reduce pitch (and hence the pitch voltage) until the voltages are balanced and the bar is again centered. Thus as the altitude error is reduced, the pitch is also reduced with the result that the flight reaches the desired level without hunting along a smooth exponential curve.

Assuming that the student erred and increased instead of decreasing pitch while approaching the desired level, the derived pitch voltage would now greatly dominate the error voltage thereby causing a much larger deflection of the horizontal bar below center to warn the student to fly down, i. e., decrease pitch, so that the flight will approach the desired level along an exponential curve.

For simulating ILS approach on a glide beam the selector switch 65 is thrown to contact 80 at "glide path" position thereby connecting the amplifier resistance 66 to the output of the summing amplifier 81 through the voltage limiter and conductor 82. The output of amplifier 81 is a voltage representing glide path error as presently described.

In regard to the student's control switch, it will be understood that in practice it is preferable to inter-relate mechanically the selector switches 25 and 65 so that for an ILS approach both the localizer and the glide path switch positions are automatically made simultaneously. In this arrangement the altitude control switch is separate and individually operated and is suitably interlocked with respect to the glide path circuit so that both circuits can not be connected at the same time to amplifier 63 for energizing the horizontal bar coil.

A switching arrangement of this character is schematically illustrated by Fig. 2 wherein the selector switch 25 is mechanically connected at 83 to the glide path switch 65a for gang operation by a switch handle 84. The switch 65a is provided with an insulating bar 65b arranged to engage the separate altitude control switch 65c and to restrain it at the "off" position when the ILS control is switched on. When the ILS control is off the altitude switch can be freely moved to both "on" and "off" positions as in practice. Operation of the altitude control switch 65c can also cause simultaneous operation of the magnetic clutch control switch 76 as indicated.

The glide path summing amplifier 81 has two voltage inputs, one voltage $e_{alt}$ from a direct driven altitude potentiometer 85 and conductor 85' and the other voltage $e_r$ from the resolver 40 and conductor 86 as indicated. The slider 87 of the altitude potentiometer 85 is connected to the shaft 70 so as to be positioned by the altitude servo above referred to. The derived voltage $e_{alt}$ and the resolver voltage $e_r$ are of opposite phase and are related so that when these voltages are equal the simulated flight is on the glide beam, and conversely when one voltage or the other dominates the flight is off the glide beam. Accordingly, a simulated flight position above or below the glide beam is represented by a glide path error voltage variable in phase and magnitude according to the sense and magnitude of the deviation. The slope of the glide beam can readily be predetermined by the distribution of resistance of the potentiometer 85 as disclosed in my aforesaid patent No. 2,560,528.

For centering the horizontal bar, it is necessary simply to adjust through the "elevator" control the pitch voltage at potentiometer 60 so that it equals the glide path error voltage $e_{gp}$. These voltages as previously described are phased so that the resultant output from amplifier 63 is zero when the pitch is adjusted for flight approach to the glide path along a smooth gradually flattening curve.

Accordingly there is provided by the present invention realistic simulation of "zero-reader" indication for instructing a student according to the various radio and flight navigation systems that are ordinarily used in practice with the actual zero-reader.

It should be understood that this invention is not limited to specific details of construction and arrangement thereof herein illustrated, and that changes and modifications may occur to one skilled in the art without departing from the spirit of the invention.

What is claimed is:

1. Simulated aircraft instrument apparatus of the zero-reader type for a grounded flight trainer comprising a two-element indicator having individually movable horizontal and vertical cross bars arranged normally to intersect at a center zero position, each bar having separate operating means, means for controlling the operating means of the horizontal bar comprising means operable in accordance with simulated pitch for deriving an electrical quantity representing pitch, means operable in accordance with simulated preselected altitude for deriving an electrical quantity representing a reference altitude, means operable according to the instant position of the simulated flight with respect to a radio station for deriving an electrical quantity representing range, means operable in accordance with instant altitude of the simulated flight for producing an electrical quantity representing altitude, means for summing said pitch and altitude reference quantities for producing an operating electrical control quantity for said horizontal bar, said pitch quantity when balanced against said altitude reference quantity causing said horizontal bar to center on zero and the simulated flight to approach the preselected altitude level without hunting, means for summing said range and altitude quantities for producing a control quantity representing radio tracking error, and means arranged for alternatively applying said altitude reference quantity and said radio tracking quantity to said first-named summing means for selectively controlling in combination with said pitch quantity said horizontal bar according to either simulated preselected altitude or radio tracking.

2. Simulated aircraft instrument apparatus of the zero-reader type for a grounded flight trainer comprising a two-element indicator having individually movable horizontal and vertical cross bars arranged normally to intersect at a center zero position, each bar having separate operating means, means for controlling the operating means of the horizontal bar comprising voltage deriving means operable in accordance with simulated pitch for deriving a pitch voltage, voltage deriving means operable in accordance with simulated preselected altitude for deriving an altitude reference voltage, voltage resolving means for producing a control voltage representing the instant range of the simulated flight from a radio station having a landing beam, voltage deriving means operable in accordance with instant altitude of the simulated flight for producing an altitude voltage, means for summing said pitch and altitude reference voltages for producing an operating control voltage for said horizontal bar, said pitch voltage when balanced against said altitude reference voltage causing said horizontal bar to center on zero and the simulated flight to approach the preselected altitude level without hunting, means for summing said range and altitude voltages for producing a control voltage representing radio tracking error, and means arranged for alternatively applying said altitude reference voltage and said radio tracking voltage to said first-named summing means for selectively controlling in combination with said pitch voltage said horizontal bar according to either simulated preselected altitude or radio tracking along said landing beam.

3. Simulated aircraft instrument apparatus of the zero-reader type for a grounded flight trainer comprising a two-element indicator having individually movable horizontal and vertical cross bars arranged normally to intersect at a center zero position, each bar having separate operating means, means for controlling the operating means of the horizontal bar comprising a potentiometer operable in accordance with simulated pitch for deriving a pitch voltage, another potentiometer adjustable to a neutral position in accordance with simulated preselected altitude and operable according to variation in altitude therefrom for deriving an altitude reference voltage, voltage resolving means operable according to the instant position of the simulated flight with respect to a radio range station having a landing beam for producing a control voltage representing range of the flight from said station, another potentiometer operable according to instant altitude of the simulated flight for deriving an altitude voltage, a summing amplifier energized by said pitch and altitude reference voltages for producing an operating voltage for said horizontal bar, said pitch voltage when balanced against said altitude reference voltage causing said horizontal bar to center on zero and the simulated flight to approach the preselected altitude level without hunting, a second summing amplifier energized by said range and altitude voltages for producing a control voltage representing radio tracking error, and a selector switch for alternatively applying said altitude reference voltage and said tracking voltage to said first-named summing amplifier for selectively controlling in combination with said pitch voltage said horizontal bar according to either simulated preselected altitude or radio tracking.

4. Simulated aircraft instrument apparatus of the zero-reader type for a grounded flight trainer comprising a two-element indicator having individually movable horizontal and vertical cross bars arranged normally to intersect at a center zero position, each bar having separate operating means, means for controlling the operating means of the horizontal bar comprising a potentiometer operable in accordance with simulated pitch for deriving a pitch voltage, altitude simulating means, another potentiometer having a pilot controlled disengageable connection with said altitude simulating means so as to be independently set at a zero position in accordance with simulated preselected altitude, said last potentiometer being operable through said connection according to variation in altitude from the preselected value for deriving an altitude reference voltage, and a summing amplifier energized by said pitch and altitude reference voltages for producing an operating voltage for said horizontal bar, said pitch voltage when balanced against said altitude reference voltage causing said horizontal bar to center on zero and the simulated flight to approach the preselected altitude level without hunting.

5. Simulated aircraft instrument apparatus of the zero-reader type for a grounded flight trainer comprising a two-element indicator having individually movable horizontal and vertical cross bars arranged normally to intersect at a center zero position, each bar having separate operating means, means for controlling the operating means of the horizontal bar comprising voltage deriving means operable in accordance with simulated pitch for deriving a pitch voltage, altitude simulating means, voltage deriving means adapted to be operated by said altitude simulating means and independently set by the pilot at a zero position to represent a simulated preselected altitude and operable with respect to said zero position according to further change in altitude by said altitude simulating means for deriving an altitude reference voltage, and means for summing said pitch and altitude reference voltages for producing an operating control voltage for said horizontal bar, said pitch voltage when balanced against said altitude reference voltage causing said horizontal bar to center on zero and the simulated flight to approach the preselected altitude level without hunting.

6. Simulated zero-reader apparatus for a grounded flight trainer comprising a two-element indicator having individually movable horizontal and vertical cross bars arranged normally to interest at a center zero position, each bar having separate operating means, means for controlling the operating means of said horizontal bar for simulating an ILS approach comprising means operable in accordance with simulated pitch for deriving an electrical quantity representing pitch, means operable according to the instant position of the simulated flight with respect to a radio range station having a landing beam for producing an electrical quantity representing range of the flight from said station, means operable in accordance with simulated altitude for deriving an electrical quantity representing altitude opposite in sense to said range quantity, and means for summing said pitch, altitude and range quantities for producing an electrical operating quantity for said horizontal bar representing glide beam error, said pitch quantity when balanced against said altitude and range quantities causing said horizontal bar to center on zero and the simulated flight to approach the represented glide path without hunting.

7. Simulated zero-reader apparatus for a grounded flight trainer comprising a two-element indicator having individually movable horizontal and vertical cross bars arranged normally to intersect at a center zero position, each bar having separate operating means, means for controlling the operating means of said horizontal bar for simulating an ILS approach comprising a potentiometer operable in accordance with simulated pitch for deriving a pitch voltage, a voltage resolver energized by coordinate voltages according to the instant position of the simulated flight with respect to a radio range station having a landing beam and adjustable according to the direction of said beam for producing a voltage representing range of the flight from said station, another potentiometer operable in accordance with simulated altitude for deriving an altitude voltage opposite in sense to said range voltage, and means for summing said pitch, altitude and range voltages for producing an operating voltage for said horizontal bar representing glide beam error, said pitch voltage when balanced against said altitude and range voltages causing said horizontal bar to center on zero and the simulated flight to approach the represented glide path without hunting.

8. Simulated zero-reader apparatus for a grounded flight trainer comprising a two-element indicator having individually movable horizontal and vertical cross bars arranged normally to intersect at a center zero position, each bar having separate operating means, means for controlling the operating means of said vertical bar comprising means operable in accordance with simulated roll for producing an electrical quantity representing roll, means operable in accordance with simulated yaw for producing an electrical quantity representing yaw, means operable in accordance with compass heading of the simulated flight for producing an electrical quantity representing heading, means for modifying said heading quantity in accordance with a preselected compass course for the simulated flight, means for summing said roll, modified heading and yaw quantities for producing an electrical operating quantity for the aforesaid vertical bar, the sense of said roll and yaw quantities with respect to said modified heading quantity being such that the resultant operating quantity is zero for centering said vertical bar when roll and yaw represent flight to said preselected course along an exponential curve.

9. Simulated zero-reader apparatus for a grounded flight trainer comprising a two-element indicator having individually movable horizontal and vertical cross bars arranged normally to intersect at a center zero position, each bar having separate electrical operating means, means for controlling the operating means of said vertical bar comprising voltage deriving means operable in accordance with simulated roll for producing a roll voltage, voltage deriving means operable in accordance with simulated yaw for producing a yaw voltage, voltage deriving means operable in accordance with compass heading of the simulated flight for producing a heading voltage, adjustable means for modifying said heading voltage in accordance with a preselected compass course for the simulated flight, means for summing said roll, modified heading and yaw voltages for producing an operating voltage for the aforesaid vertical bar, the sense of said roll and yaw voltages with respect to said modified heading voltage being such that the resultant operating voltage is zero for centering said vertical bar when roll and yaw represent flight to said preselected course along an exponential curve.

10. Simulated zero-reader apparatus for a grounded flight trainer comprising a two-element indicator having individually movable horizontal and vertical cross bars arranged normally to intersect at a center zero position, each bar having separate electrical operating means, means for controlling the operating means of said vertical bar comprising a potentiometer operable in accordance with simulated roll for producing a roll voltage, another potentiometer operable in accordance with simulated yaw for producing a yaw voltage, a voltage resolver of the rotary transformer type operable in accordance with compass heading of the simulated flight for producing a heading voltage, manual means for adjusting said resolver for modifying said heading voltage in accordance with a preselected compass course for the simulated flight, means for summing said modified heading and yaw voltages, and means for in turn summing the resultant summed voltage and said roll voltage for producing an operating voltage for the aforesaid vertical bar, the sense of said voltages being such that the operating voltage is zero for centering said vertical bar when roll and yaw represent the simulated flight as approaching said preselected course along a gradually flattening curve.

11. Simulated zero-reader apparatus for a grounded flight trainer comprising a two-element indicator having individually movable horizontal and vertical cross bars arranged normally to intersect at a center zero position, each bar having separate electrical operating means, means for controlling the operating means of said vertical bar comprising voltage deriving means operable in accordance with simulated roll for producing a roll voltage, voltage deriving means operable in accordance with simulated yaw for producing a yaw voltage, voltage deriving means energized in accordance with coordinated values of the instant position of the simulated flight with respect to a radio station having a radio direction beam and adjustable according to the direction of said beam for producing a tracking error voltage, and means for summing said roll, yaw and tracking error voltages for producing an operating voltage for the aforesaid vertical bar, the sense of said voltages being such that the resultant operating voltage is zero for centering said vertical bar when roll and yaw represent the simulated flight as approaching said direction beam along a gradually flattening curve.

12. Simulated zero-reader apparatus for a grounded flight trainer comprising a two-element indicator having individually movable horizontal and vertical cross bars arranged normally to intersect at a center zero position, each bar having separate electrical operating means, means for controlling the operating means of said vertical bar comprising voltage deriving means operable respectively in accordance with simulated roll and yaw for producing a pair of control voltages, voltage deriving means operable in accordance with simulated compass heading and adjustable in accordance with a preselected compass course for the simulated flight, for producing another control voltage, resolving means energized according to the coordinate values of the instant position of the simulated flight with respect to a radio station having a direction beam and adjustable according to the direction of said beam for producing a tracking error voltage, summing amplifier means energized by said pair of voltages, and a selector switch for alternatively connecting said compass heading voltage and said tracking voltage to said summing means, the sense of the summing amplifier voltages being such that the resultant operating voltage is zero for centering said vertical bar when roll and yaw represent the simulated flight as approaching the respective course or direction beam along a gradually flattening curve.

13. Simulated zero-reader apparatus for a grounded flight trainer comprising a two-element indicator having individually movable horizontal and vertical cross bars arranged normally to intersect at a center zero position, each bar having separate electrical operating means, means for controlling the respective operating means of said bars comprising voltage deriving means operable in accordance with roll, yaw, compass heading, pitch and preselected altitude of a simulated flight for producing respective voltages, means for modifying the compass heading voltage in accordance with a preselected compass course for the simulated flight, means for summing said roll, yaw and modified heading voltages for producing an operating voltage for the vertical bar, means for summing the pitch and altitude voltages for producing an operating voltage for the horizontal bar, the respective sense of the modified heading and altitude voltages being such that the resultant operating voltage in each case is zero for centering the respective bar when the remaining flight attitudes represent the simulated flight as approaching the preselected level or course along a gradually flattening curve, a voltage resolver energized according to coordinate values of the instant simulated flight position with respect to a radio station having glide and localizer landing beams and adjustable according to the direction of the localizer beam for producing voltages representing localizer beam deviation and instant range to said station respectively, means for deriving a voltage representing instant altitude, and means for selectively applying said deviation voltage in place of said heading voltage and for selectively applying said range and altitude voltages in place of said preselected altitude voltage to the respective summing means for representing an ILS approach.

References Cited in the file of this patent

UNITED STATES PATENTS

| Number | Name | Date |
|---|---|---|
| 2,008,401 | Philpott | July 16, 1935 |
| 2,119,530 | Dunmore | June 7, 1938 |
| 2,381,872 | Baker | Aug. 14, 1945 |
| 2,467,412 | Wathen | Apr. 19, 1949 |
| 2,471,315 | Dehmel | May 24, 1949 |
| 2,571,591 | Nightenhelser | Aug. 8, 1950 |
| 2,560,527 | Dehmel | July 10, 1951 |
| 2,560,528 | Dehmel | July 10, 1951 |